United States Patent [19]
Wertheim

[11] 3,732,627
[45] May 15, 1973

[54] REMOVAL OF A LIQUID PHASE FROM A MATERIAL

[76] Inventor: Reinhold Adolf Philipp Wertheim, 1 Hillmont Road, Esher, Surrey, England

[22] Filed: Nov. 23, 1970

[21] Appl. No.: 91,756

[52] U.S. Cl............................................34/9, 34/95
[51] Int. Cl..............................................F26b 3/00
[58] Field of Search......................................34/9, 95

[56] References Cited

UNITED STATES PATENTS

| | | | |
|---|---|---|---|
| 2,789,369 | 4/1957 | Walker | 34/95 |
| 2,397,897 | 4/1946 | Wenger | 34/9 X |
| 2,473,184 | 6/1949 | Webb | 34/9 |

Primary Examiner—John J. Camby
Attorney—Cushman, Darby & Cushman

[57] ABSTRACT

This invention relates to a process and apparatus for removing a liquid phase from a material comprising a liquid phase and a solid phase. This is achieved by bringing a desiccant into close proximity with a liquid-permeable emitter against which is the material to be treated. The desiccant is sufficiently close for the liquid to be drawn off in the form of a vapor, directly onto or into the desiccant.

18 Claims, 3 Drawing Figures

REMOVAL OF A LIQUID PHASE FROM A MATERIAL

This invention relates to the removal of a liquid phase from a material comprising a solid phase and a liquid phase, and in particular but not exclusively to dehydration i.e. the removal of water from material. This invention also relates to apparatuses for effecting such removal.

It is known how to dehydrate, for example, foodstuffs by freeze-drying or spray-drying. However, frequently when foodstuffs are dehydrated by these methods, the dehydrated foodstuffs, when reconstituted by the addition of water, lack some of the characteristics found originally. For instance, dairy cream, when spray-dried and then reconstituted, cannot be satisfactorily whipped.

Accordingly, it is an object of the present invention to provide a process which can produce products in which such disadvantages are absent or reduced.

According to the present invention, there is provided a process for removing a liquid phase from a material comprising a solid phase and the liquid phase, which process comprises transferring the liquid phase from the said material into a liquid-permeable emitter constituted by a layer in contact with the said material, and extracting from the emitter the originally liquid phase as vapor phase, the emitter thereby acting as a means for transforming the liquid phase into vapor phase.

The term "liquid phase" is used herein to cover the case in which, when water is being removed, the water molecules are present in the form of moisture, i.e. bound water or agglomerates of water molecules.

A usual practice is to position a desiccant close to the emitter at a distance over which the desiccant can exercise its extraction forces on the molecules or molecular aggregates of the originally liquid phase in the region of the surface of the emitter. This results in enormously improved drying procedures both for small and large scale applications as will be demonstrated by Examples at a later stage in this specification.

The term, "desiccant" as used herein means any agent capable of adsorbing or absorbing the vapor of water or any other liquid. Generally, the desiccant is spaced from the emitter by a distance of less than 1 mm. Such a distance is small enough for any molecule of the liquid phase, when emitted from the emitter, to be under the vapor pressure gradient of the desiccant. The vapor pressure gradient can be regarded as the variation of vapor pressure with distance within the gap between the emitter and desiccant.

The process of the present invention is particularly applicable to food, chemicals and to pharmaceutical preparations.

In certain cases the materials to be treated are preferably subjected to preliminary preparations, for example, at least one of slicing, dicing, shredding, grating, granulating, extruding and powdering. Materials to which the process of the present invention is applicable could be of plastic, granular, powdery, short-textured, cake-like or viscous liquid consistency.

Examples of materials which can be treated, in this case dehydrated, by the present invention include cereals, such as barley; fruit; vegetables; fruit and vegetable products, such as pulps; yeasts; meat products; fish products; composite foods, such as soup mixes; dairy product, such as dairy creams and cheeses; bakery ingredients, such as liquid whole egg and emulsifiers; food flavoring materials; imitation creams; as well as plastics materials in suitable form. The process of the present invention is also applicable to the dehydration of biological tissues and to other suitably prepared specimens of animal and plant origin.

As previously mentioned, the process according to this invention may require the use of pre-treatments to prepare and/or convert materials for liquid removal, for example dehydration, into a suitable form, or the extraction or isolation of components or combinations of components for treatment by the process. Examples of such pre-treatments will be referred to at a later stage in this specification.

In order to expose a maximum surface area for extraction of the liquid phase, the material to be treated, together with the emitters (one on each side), is preferably "sandwiched" i.e. interposed in the form of conveniently thin layers or slabs between adjacent layers of desiccant materials. Desiccant materials are generally in granular or powdered form and may, for example, be silica gel or molecular sieve materials or mixtures thereof, or calcium oxide.

Liquid desiccants, possibly in association with solid desiccant(s), may be utilized subject to suitable design features of the containing space and/or dehydration system. However, as mentioned above, the liquid desiccants must not directly contact the emitter.

It may be preferable to use combinations of desiccants to achieve certain desirable drying characteristics and these combinations of desiccants may be mixtures or they may be kept physically separated, for instance in the form of layers or pockets of one material within permeable bags or pouches dispersed in the other material.

By having any two adjacent surfaces of material and desiccant separated by one or more continuous layers of a membrane system, contamination of the material by the desiccant(s) can be prevented. Such a separating membrane should offer a minimum resistance to the movement of liquid phase from the material. The separating membranes can act as the emitter in this case.

The separating membrane can consist of one or more layers of a different nature in combination, for instance a parchment layer in combination with a polyester fiber mesh. An alternative separating membrane system could for instance be a suitably fine filtration membrane in combination with a fibrous mesh such as a polyester fiber mesh, regenerated cellulose fiber mesh or cotton mesh. An important feature of the separating membrane, which on one side is in contact with the material to be treated (dried), is to draw liquid out of the material, which liquid is then emitted in vapor form into the space adjacent to the desiccant(s) under the vapor pressure gradient.

Instead of providing a separate membrane as the emitter, the emitter can be constituted, in certain cases, by a region formed on the surface of the material being dried.

In addition to any separation membrane, there may be a suitable mesh material or combination of mesh materials or one or more permeable layers of material for retaining the desiccant(s) within the desired position.

Such a meshing can be a suitable way of achieving the correct distance between the emitter and desiccant, if the thickness of the mesh or diameter of the mesh wire is suitably chosen.

It also allows part of the heat of absorption of the desiccants (where appropriate) to be conducted to the emitter to provide heat of vaporization.

In order to minimize the possible deterioration of the material being treated and/or desiccant(s), by atmospheric oxygen or other substances, the process might with advantage be carried out under vacuum or partial vacuum by enclosing the sandwich arrangement (or any other arrangement) of desiccant and material layers into a space which can be effectively evacuated. Similarly the sandwich arrangement might with advantage be held in a reasonably sterile atmosphere and for that purpose be contained in a space which can be suitable isolated and/or pressurized or evacuated. The process of this invention may therefore, subject to suitable precautions, be carried out under sterile or reasonably sterile or aseptic conditions.

It may be desirable to have a variety of additives contained or dispersed in the desiccant layers and it is sometimes of advantage to keep such additives separated from the desiccant(s), for example in separate layers or in suitable pouches. Such additives and/or suitably selective desiccants may be required to remove undesirable volatile constitutents and/or stagnant layers of gases or air. This may also be achieved by the use of suitable desiccant(s) or combinations of desiccants with suitable additives. A suitable additive could be activated charcoal.

The arrangement of the material to be treated, the emitter and the desiccant may be looked upon by analogy with a transistor combination of p and n - type materials in which the material acts as the donor of liquid to be freely available to the emitter, e.g. separating membrane, acting as emitter. Such liquid as vapor is then drawn into the space immediately adjacent to the emitter to be collected by the low vapor pressure space in contact with the desiccant(s) acting as an absorber of the liquid molecules or molecular aggregates.

In order to ensure a maximum of available transfer by the emitter, the system may be subjected to suitable movement, for instance by being revolved thereby introducing a tumbling movement into the material to be dried, if suitably prepared and arranged in association with the membrane system. Such motion may also assist in the absorbing action of the desiccant layer(s). Other methods of promoting the rapid exchange of liquid molecules between donor (material to be treated) and absorber (desiccant) would be to minimize the build-up of stagnant layers of vapor by circulating air and/or other gases and/or conditioning the atmospheric space interposed between emitter and collector layers. The choice of a non-selective absorbant or the addition of a proportion of such an absorbant to the desiccant may also be advantageous for this purpose.

The desiccant(s) may be packed into frames or trays having solid edges but faced with mesh or finely perforated sheeting. In this form the desiccant(s) may be regenerated within its enclosure when the material has been dried and removed, and the material to be treated and desiccant layers packed as a sandwich arrangement. One of the purposes of having a perforated mesh not only on the top but also on the bottom of the desiccant tray(s) or frames is that this construction assists the more rapid and uniform heat regeneration following vapor absorption by the desiccants, which can be effectively re-activated in this way.

The desiccant(s) may be packed into an enclosure containing a thermostatically controlled heating element so that it can be regenerated without removal from the dehydration equipment.

When the desiccant material emits heat on moisture absorption, means should be provided for the dissipation of heat so as to prevent a temperature rise of the material being dried. If available, it is preferable to use a suitable desiccant which absorbs heat upon vapor absorption particularly when heat sensitive materials are being dried. The process is generally operated at relatively low temperatures (for example, usually 28°F. to 42°F. for dairy cream) and a desiccant of the latter type would then be expected to assist in reducing external cooling requirements.

An alternative way of minimizing or preventing the establishment of gas or vapor barriers between the emitter and desiccant is by the application of other mechanical methods. These may consist of introducing suitable vibrations into the system or sandwich, or by the use of moving objects, for instance bars with or without a mechanical drive.

The process of this invention may be operated at any suitable temperature; owing to the operation of the drying, liquid removal can take place under conditions in which the material dries at a relatively low temperature. The process may be operated so that drying takes place at different temperatures depending upon the stage of drying. Arrangements could also be made for the material to be maintained at a different temperature from that of the desiccant during a part, or throughout the whole, of the process.

In principle, the procedure for packing a single sandwich of material for drying and desiccant layers with desiccant in powder or granular form would be, for example, as follows.

The material for drying would be deposited in a suitable form on to a separating membrane and it should be covered by another layer of membrane, thereby forming a "wallet" or envelope enclosing the material within a moisture-emitting (i.e. permeable) membrane-covering combination. Such a wallet containing the material would be sandwiched between two desiccant layers, the upper desiccant layer consisting of a shallow tray having a perforated or mesh base and the lower desiccant layer i.e. tray having its upper surface entirely open or covered with mesh or perforated top layer. The mesh or perforation apertures should be sufficiently small not to allow desiccant particles to pass through yet offering little or practically no resistance to the passage of water vapor or the vapor of another liquid.

In practice, liquid-removal by means of such devices and particularly for large scale operations, is accomplished by using stacks of such sandwiches or material wallets within desiccant layers. The process can be effected in cabinets of a suitable size and shape, which are preferably heat insulated, and in which such completed stacks, consisting of alternate layers of material within wallets and desiccants trays, are arranged to be situated during the process. With the interfaces substantially horizontal, the stacks should be constructed so that desiccant layers, in their trays, can be racked apart to place product wallets into position for drying and easy removal of such wallets on completion of the process.

The cabinet in which the process takes place may also be used for heat regeneration of the desiccants without removing them from the cabinet or containing trays, by having heating elements of a suitable size at suitable positions in the cabinet or trays or by having other means of introducing adequate heating into the cabinets which thereby act as regenerating ovens after processing when the dried materials have been removed.

If means for air circulation are provided in the cabinet to assist heat distribution during regeneration, such means for providing air circulation may also be utilized during the drying process to assist in the processing as previously described with or without the introduction of specially conditioned air into the cabinet. Air circulation during processing with the cabinet loaded with material to be dried may also assist in the dissipation of heat from the desiccant(s) of appropriate vapor absorption characteristics if required.

Apart from preliminary preparation operations such as slicing, dicing, shredding or coring, vegetables and fruit are likely to require pre-treatments such as blanching, acid spraying and/or sulphur treatments. Suspensions may require pre-treatments aimed at separating part or all of the suspending media by processes such as filtration as in the case of yeasts, and/or concentration by evaporation and/or dehydration to an appropriate degree by conventional means. Similarly solid products such as fruit and vegetables may, with advantage, be pre-dried to an appropriate degree by conventional dehydration processes.

Mixtures containing fat, water and other components in suspension and/or solution, such as cream, other dairy products, imitation creams and related mixtures, may require pre-treatments to convert relevant combinations of components into a suitable form for dehydration by the processes of this invention. Such pre-treatments may consist of single or multi-step freezing treatments followed by a thawing treatment to produce coagulated agglomerates of suspended matter of the components of the original mixture which, after separation of the suspending and/or permeating liquid by such means as centrifugal filtration, are in a condition suitable for dehydration by the process of this invention.

According to another aspect of the present invention there is provided an apparatus suitable for carrying out the process of the present invention, which comprises a vessel provided with a chamber, a first frame containing a desiccant, a second frame containing a desiccant, means for moving said second frame closer to, and away from, said first frame, and means for heating the frames, said vessel being provided with an aperture through which material to be treated and emitters can be introduced into, and removed from, the vessel in a position between said first and second frames.

In a preferred embodiment the apparatus further comprises a third frame containing a desiccant, on the opposite side of said first frame to the second frame, and means for moving said third frame towards, and away from, said first frame, means also being provided for material to be treated and emitters to be introduced between said first and third frames.

Preferably, in this arrangement, the heater for the desiccant regeneration is provided in said first (middle) frame.

In an alternative embodiment, the apparatus comprises a continuous tunnel provided with at least two apertures, a framework carrying desiccant-containing frames and movable through said tunnel, and means for regenerating the desiccant as that region of the framework passes through a portion of the tunnel between the two apertures.

The present invention will now be described by the following examples.

Example 1

This example describes the dehydration of dairy cream.

The dairy cream was first pre-treated by minimum pasteurization at 163°F. for 15 seconds and homogenization at a pressure of 3,000 lbs. per square inch. Then the cream (initially at 5°C.) was subjected to a freezing treatment in which the temperature of the mixture was lowered to approximately 0°C. to −20°C., in this case −12°C., and in order to achieve a separation yielding a clear liquor the final freezing temperature to which the mixture was further lowered ranged from −20°C. to −50°C., in this case −25°C. The initial rate of lowering of temperatures should preferably be controlled and for cream, freezing times in excess of 2 hours have been found adequate. In this case cooling from +5° to −12°C. took 2.5 hours. Then the frozen cream was thawed. Thawing should take place under conditions of ambient temperature not exceeding 40°C. (in this case, 25°C.) and the final temperature to which the mixture was slowly heated was as close as possible to 0°C.

The foregoing pre-treatment was carried out by subjecting the cream to the above-mentioned temperature treatments in shallow containers, with a sheet of a polyester film on the surface of the mixture. Water or other liquid which melted on thawing was drained and then separated in a centrifuge. Then the resulting "cake" of coagulated agglomerates was washed with water, chilled water or salt to yield a deposit with less protein and/or other suspended matter. The washing is optional.

The resulting agglomerated dairy cream was spread out with a height of 1.9 cm (1 to 2 cm. have given good results) over a vegetable parchment which is to act as emitter. Another part of the vegetable parchment over which the agglomerates had not been spread was folded over the first-mentioned part to form a wallet. Then the wallet was placed on a wire mesh below which was a silica gel desiccant and the mesh and wallet was raised until the upper side of the wallet was 0.5 mm. below another layer of silica gel desiccant supported by another mesh. The vertical distance between the lower face of the wallet and the lower silica gel was also 0.5 mm. The temperature during dehydration was maintained in the range from 0°C. to 10°C., usually at approximately 5°C.

The dehydration was carried out for 10 to 15 days, in this particular case 15 days, at atmospheric pressure in air. The water content in the dried dairy cream was approximately 2 to 5 percent by weight.

It may be necessary to circulate air of suitable controlled moisture content and a temperature at approximately 0°C. to 10°C. through the processing cabinet.

In the course of this dehydration process, the individual crumbs of broken-up agglomerates may fuse together into a substantially continuous layer. At the end if this drying process, such layers may conveniently be broken up by means of a milling machine which is capable of operating so that the softening temperature point of the fat is not reached during this operation. The milling machine may also be used for mixing other products into the product, such as milk powder and if desirable and permissible other substances.

Example 2

Compressed baker's yeast in cake form was crumbled and spread out in a layer having a height of 0.5 cm. over one side of a water-permeable membrane formed of rayon.

A desiccant in the form of a mixture of silica gel and molecular sieve (type 13X by Union Carbide) was brought to within 0.5 mm. of the other side of the membrane. The process of the present invention was effected in a cabinet maintained at a temperature of 8°C., in air at normal atmospheric pressure for 12 to 15 hours, in this case 14 hours. It was found that after this time the moisture content in the yeast had been reduced to approximately 8 percent by weight.

Example 3

Recently picked apples were diced into cubes having edges approximately 0.5 cm. in length.

The cubes were then pretreated in the following way, although it should be noted that the pretreatment is optional: the cubes were dipped for 5 minutes into an aqueous solution of sodium sulphite, formed by dissolving 4 g. of crystalline sodium sulphite in 1 liter of water. After the dipping, excess solution was shaken off the cubes.

A single layer of the apple cubes then formed with a packing density of 2g./square inch over the membrane which consisted of a layer of terylene mesh and a layer of vegetable parchment against the terylene mesh. The apple was laid in contact with the terylene side of the membrane.

A desiccant, in this case silica gel, was brought up to within 0.5 mm. of the vegetable parchment and the dehydration was commenced. The dehydration was carried out at a temperature of 12°C. in air at atmospheric pressure for 40 hours. At the end of this time the average water content of the apple was found to have been reduced to approximately 15 percent.

The process according to the present invention may be operated batchwise as described above or can be effected in a continuous manner, for example as follows.

The material to be dried can be arranged to pass relatively slowly through a tunnel or some other enclosure, maintained under the correct conditions of temperature, relative humidity, and/or gas concentration, so as to move past or relative to or in contact with desiccant layers or trays. Preferably two-thirds of the tunnel is designed for drying, after which the material is removed, and the following remaining one-third is designed for regeneration of the desiccant. For the continuous operation of the process applied to dairy cream, continuous pre-treatment can also be effected by passing the cream slowly through a freezing tunnel to be followed by passage through a thawing enclosure with the separation of the coagulated agglomerates arranged to take place in a centrifugal machine capable of continuous or automatic batchwise operation.

The process of the present invention can also be applied to the drying of surface layers, films, sheets or slabs of materials, such as sheets of metal or glass surfaces which may have to be specially dried or conditioned or prepared for plating or other processes.

For a better understanding of the present invention and to show how the same can be carried into effect, reference will now be made to the accompanying drawing, in which.

Figure 1:
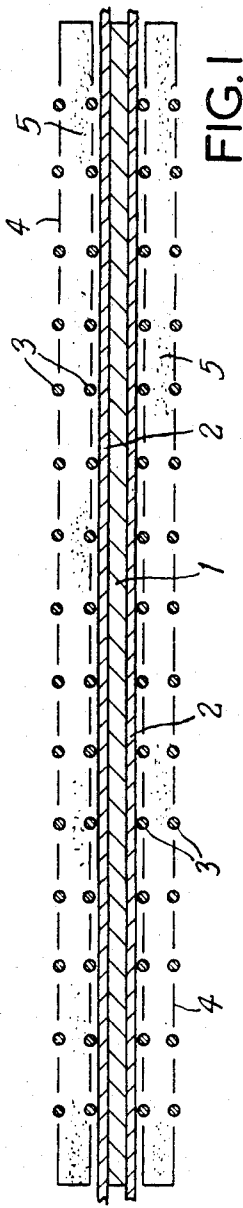
FIG. 1 is a cross-section taken through a sandwich.

Referring firstly to FIG. 1, a layer 1 of material to be dehydrated is enclosed by two layers 2 of a water-permeably emitter, the combination of layers 1 and 2 constituting a wallet. The wallet presses gently on each of its faces against a wire mesh 3 forming the facing side of a perforated container 4 containing a desiccant 5. It is the wire of the mesh 3 which gives the desired spacing between the emitter 2 and the desiccant 5.

Figure 2:
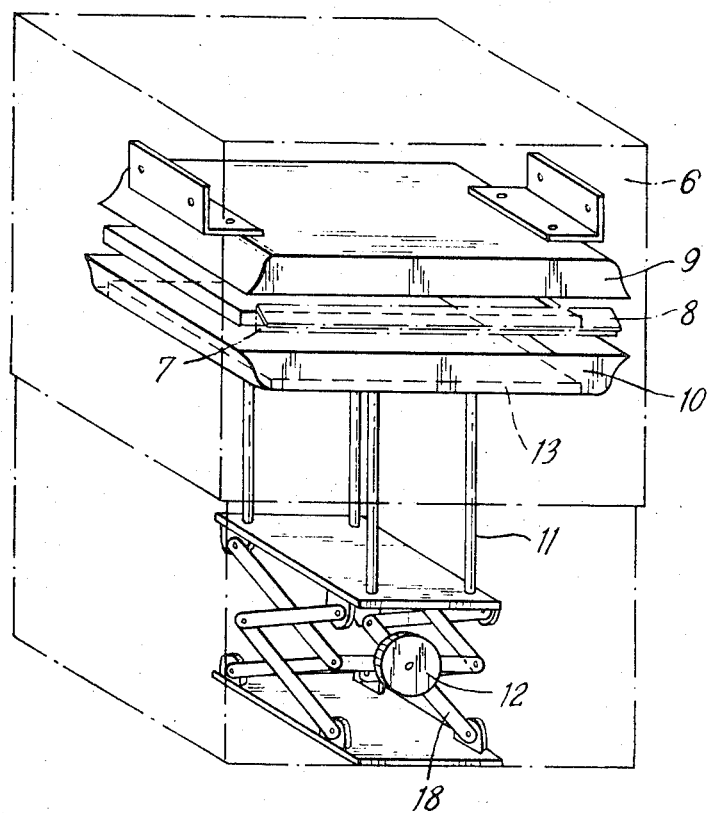
FIG. 2 is an oblique view of an apparatus according to the present invention, in which all components are shown without being blocked by other components.

The apparatus shown in FIG. 2 consists of a cabinet 6 on the front face of which is an oblong rectangular aperture 7 which can be covered by a flap 8. Inside the cabinet 6 and just above the height of the aperture 7 is a tray 9 having a perforated base and containing a desiccant.

Below the aperture 7, and inside the cabinet 6, is another tray 10, which has a perforated top and which contains desiccant. The tray 10 can be moved on vertical rods 11 by a jack 18 operated by a control knob 12. In practice, the tray 10 is in a lowered position, a wallet is inserted through the aperture 7 and placed on the tray 10, the knob 12 is rotated until the wallet is gently pressed between the trays 9 and 10, and dehydration is allowed to proceed.

When the desired degree of desiccation has taken place, the wallet is removed and the desiccant can be removed by switching "on" a heating element 13 fixed to the lower side of the tray 10.

Figure 3:
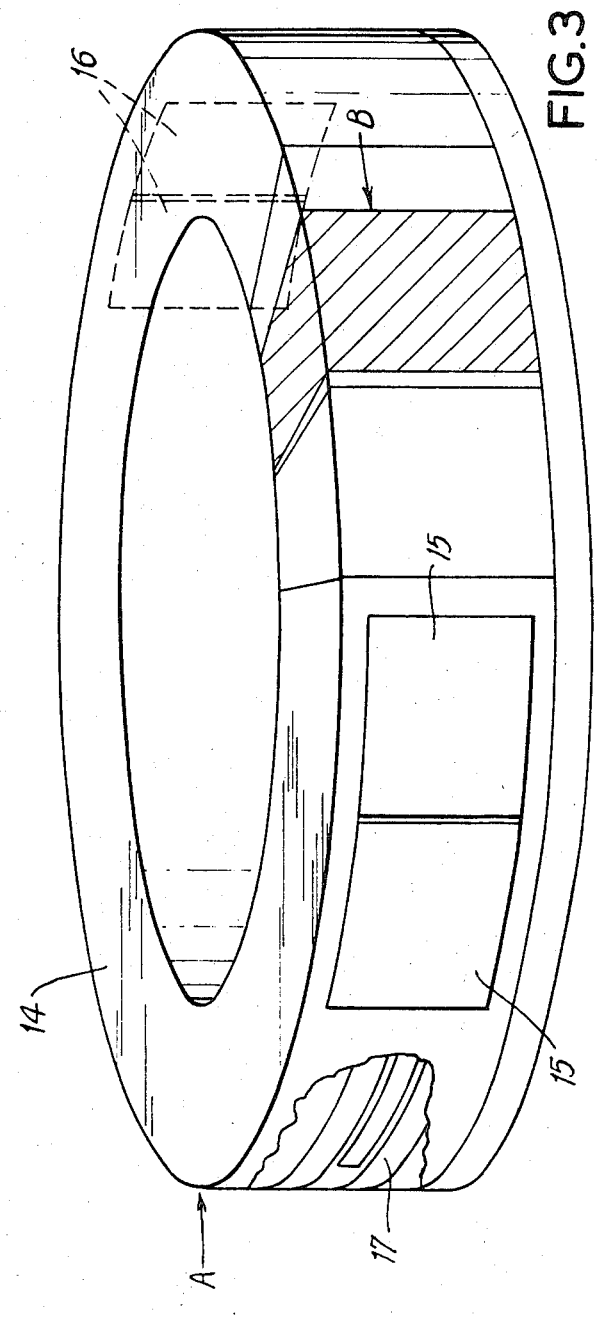
FIG. 3 is an oblique view of another apparatus according to the present invention.

Referring now to FIG. 3, there is shown an apparatus suitable for continuous operation. An annular tunnel 14 is provided with an aperture 15 and with another aperture 16 at a radial position 120° from the first aperture 15. Inside the tunnel is a slowly moving framework 17 carrying trays of desiccant. Wallets of material to be dried are introduced into the framework between the trays through aperture 15. The framework travels in a clockwise direction (as viewed from above) and, in the region indicated by A, dehydration occurs. The desiccated wallets are removed through the aperture 16 and, as the framework 17 passes through the region B, the desiccant is regenerated by heating produced by heaters (not shown) in that region B.

I Claim:

1. Process for removing a liquid phase from a material comprising a solid phase and the liquid phase, which process comprises transferring the liquid phase from said material into a liquid-permeable emitter constituted by a layer in contact with said material, and extracting from the emitter the originally liquid phase as vapor phase, the emitter thereby acting as a means for transforming the liquid phase into vapor phase.

2. Process according to claim 1, wherein the vapor phase extracted from the emitter is absorbed in a desiccant in spaced relationship to but less than 1.0 millimeter from the emitter.

3. Process according to claim 1, wherein the material is selected from the group consisting of a cereal, fruit, vegetable, yeast, meat, fish, dairy produce, biological tissue and plastics material.

4. Process according to claim 1, wherein the emitter is formed from at least one substance selected from the group consisting of parchment, polyester fiber mesh, regenerated cellulose fiber mesh or a cotton mesh.

5. Process according to claim 1, wherein the liquid phase is water.

6. Process according to claim 2, wherein the desiccant is selected from the group consisting of silica gel, a mixture of silica gel and a molecular sieve, and calcium oxide.

7. Process according to claim 2, wherein there are present at least two different desiccants contained in different vapor-permeable containers.

8. Process according to claim 2, wherein the desiccant contains an additive.

9. Process according to claim 8, wherein the additive is activated charcoal.

10. Process according to claim 1, wherein the liquid removal is effected in a sterile atmosphere of which the pressure is greater than normal atmospheric pressure.

11. Process according to claim 1, wherein the liquid removal is effected in an atmosphere which is subjected to agitation.

12. Process according to claim 2, wherein a layer of material has on each face thereof an emitter, and each emitter is in said spaced relationship to a desiccant.

13. Process according to claim 1, wherein the material, prior to being subjected to liquid-removal, is subjected to a preparation selected from the group consisting of slicing, dicing, shredding, grating, granulating, extruding and powdering.

14. Process according to claim 1 for dehydrating cream, wherein the cream is first subjected to a pretreatment comprising freezing, thawing and the separation of the resulting liquor from coagulated agglomerates, which are thereafter subjected to liquid removal.

15. Process according to claim 1, wherein the liquid-removal is effected at a temperature of 0° to 10°C.

16. Process according to claim 2, wherein during at least part of the liquid phase removal, the material and the desiccant are maintained at different temperatures.

17. Process according to claim 2, wherein, after the desired degree of liquid removal has been achieved, the material is removed from the desiccant and the latter is regenerated.

18. A process according to claim 1, wherein the removal of liquid phase and extraction of liquid phase as vapor phase are effected continuously.

* * * * *